(12) United States Patent
Umeyama et al.

(10) Patent No.: US 10,014,512 B2
(45) Date of Patent: Jul. 3, 2018

(54) METHOD OF MANUFACTURING ELECTRIC POWER STORAGE DEVICE, AND ELECTRIC POWER STORAGE DEVICE

(71) Applicant: TOYOTA JIDOSHA KABUSHIKI KAISHA, Toyota-shi, Aichi-ken (JP)

(72) Inventors: Hiroya Umeyama, Okazaki (JP); Kiyomi Kozuki, Morigucki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 103 days.

(21) Appl. No.: 14/980,157

(22) Filed: Dec. 28, 2015

(65) Prior Publication Data

US 2016/0260951 A1   Sep. 8, 2016

(30) Foreign Application Priority Data

Mar. 3, 2015 (JP) ................. 2015-041187

(51) Int. Cl.
*H01M 2/26* (2006.01)
*H01M 2/30* (2006.01)
*H01M 10/052* (2010.01)
*H01M 10/0587* (2010.01)
*H01G 11/74* (2013.01)

(52) U.S. Cl.
CPC ............ *H01M 2/26* (2013.01); *H01G 11/74* (2013.01); *H01M 2/30* (2013.01); *H01M 10/052* (2013.01); *H01M 10/0587* (2013.01)

(58) Field of Classification Search
CPC ............ H01M 2/26; H01M 2/30; H01M 4/64; H01M 4/70; H01G 11/74
See application file for complete search history.

(56) References Cited

U.S. PATENT DOCUMENTS

| 2005/0221178 A1 | 10/2005 | Kim | |
|---|---|---|---|
| 2011/0253469 A1* | 10/2011 | Landrieve | B60B 27/02 180/219 |

(Continued)

FOREIGN PATENT DOCUMENTS

| JP | 2002-075321 A | 3/2002 |
|---|---|---|
| JP | 2002260670 A * | 9/2002 |

(Continued)

OTHER PUBLICATIONS http://www.onlinemetals.com/meltpt.cfm (Date Unknown).*

(Continued)

*Primary Examiner* — Gregg Cantelmo
(74) *Attorney, Agent, or Firm* — Sughrue Mion, PLLC

(57) ABSTRACT

A method of manufacturing an electric power storage device includes a connection step of connecting an exposed portion, which is provided at one end in a direction of width of an electrode and constructed without a composite material layer being provided in a current collector, and a collector terminal provided on an outer side relative to the exposed portion in the direction of width of the electrode to each other. In the connection step, while a metal layer composed of a second metal higher in melting point than a first metal which forms the collector terminal lies between the exposed portion and the collector terminal, at least a portion of contact of the collector terminal with the metal layer is irradiated with energy.

19 Claims, 8 Drawing Sheets

(56) References Cited

U.S. PATENT DOCUMENTS

2013/0022849 A1    1/2013   Kusama et al.
2014/0087225 A1    5/2014   Zhang et al.

FOREIGN PATENT DOCUMENTS

| JP | 2003-031215 A | | 1/2003 |
|----|---------------|---|--------|
| JP | 2005-197205 A | | 7/2005 |
| JP | 2005-302719 A | | 10/2005 |
| JP | 2009-187858 A | | 8/2009 |
| JP | 2010258003 A | * | 11/2010 |
| JP | 2011-029026 A | | 2/2011 |
| KR | 10-2008-0095612 A | | 10/2008 |
| WO | 2011/125151 A1 | | 10/2011 |

OTHER PUBLICATIONS

J-PlatPat machine translation of the detailed description of JP 2002-075321A (Mar. 2002).*
J-PlatPat machine translation of the detailed description of JP 2002-260670A (Sep. 2002).*
J-PlatPat machine translation of the detailed description of JP 2010-258003A (Nov. 2010).*

* cited by examiner

WIDTH DIRECTION OF POSITIVE ELECTRODE

AXIAL DIRECTION OF ELECTRODE ASSEMBLY
WIDTH DIRECTION OF POSITIVE ELECTRODE
WIDTH DIRECTION OF NEGATIVE ELECTRODE

AXIAL DIRECTION OF ELECTRODE ASSEMBLY
WIDTH DIRECTION OF POSITIVE ELECTRODE
WIDTH DIRECTION OF NEGATIVE ELECTRODE

— OCCURRENCE OF THINNING AT EXPOSED PORTION

— OCCURRENCE OF DISCONNECTION AT EXPOSED PORTION

METHOD OF MANUFACTURING ELECTRIC POWER STORAGE DEVICE, AND ELECTRIC POWER STORAGE DEVICE

This nonprovisional application is based on Japanese Patent Application No. 2015-041187 filed with the Japan Patent Office on Mar. 3, 2015, the entire contents of which are hereby incorporated by reference.

BACKGROUND OF THE INVENTION

Field of the Invention

The present invention relates to a method of manufacturing an electric power storage device and to an electric power storage device.

Description of the Background Art

Japanese Patent Laying-Open No. 2005-302719 describes a collector terminal being fixed to an uncoated region of an electrode through laser welding. This patent literature describes that an uncoated region of an electrode is a site where no active material is applied in a current collector.

SUMMARY OF THE INVENTION

Development of an electric power storage device used for a power supply for cars, an industrial power supply, or a household power supply has recently actively been accelerated, and such an electric power storage device is required to have ensured performance even during charging and discharging at a high rate. In order to meet such requirements, for example, welding of a collector terminal connected to an external terminal to an end surface of an electrode assembly (end-surface current collection) has been proposed.

End-surface current collection will specifically be described below with reference to a non-aqueous electrolytic secondary battery including a wound electrode assembly representing one example of an electric power storage device. Initially, a wound electrode assembly is fabricated. Specifically, a positive electrode having at one end in a direction of width, a positive electrode exposed portion constructed without a positive electrode composite material layer being provided in a positive electrode current collector and a negative electrode having at one end in the direction of width, a negative electrode exposed portion constructed without a negative electrode composite material layer being provided in a negative electrode current collector are prepared. The positive electrode, the negative electrode, and a separator are arranged such that the positive electrode exposed portion and the negative electrode exposed portion protrude from the separator in directions opposite to each other, and an axis of winding is arranged to be in parallel to the direction of width of the positive electrode and the direction of width of the negative electrode. The positive electrode, the negative electrode, and the separator are wound around this axis of winding. The wound electrode assembly is thus obtained.

Then, a positive electrode collector terminal is caused to face an end surface of the positive electrode exposed portion, and the positive electrode collector terminal is irradiated with laser beams from a side opposite to the wound electrode assembly with respect to the positive electrode collector terminal. At the positive electrode collector terminal, melting occurs in a portion irradiated with laser beams. When the molten positive electrode collector terminal (a molten portion of the positive electrode collector terminal) is in contact with the positive electrode exposed portion, a portion of the positive electrode exposed portion with which the molten portion of the positive electrode collector terminal is in contact melts. As the molten portion of the positive electrode collector terminal and the molten positive electrode exposed portion (the molten portion of the positive electrode exposed portion) solidify while they are in contact with each other, the positive electrode collector terminal and the positive electrode exposed portion are connected to each other (end-surface current collection). A negative electrode collector terminal and the negative electrode exposed portion are connected to each other in accordance with a similar method.

It has now been found that thinning (FIG. 10) or disconnection (FIG. 11) may occur at an exposed portion when end-surface current collection is carried out in accordance with the method above. When thinning occurs at the exposed portion, current collecting resistance increases, which leads to lowering in performance of the electric power storage device. In addition, since tensile strength of the exposed portion lowers, disconnection of the exposed portion occurs during manufacturing or during use of the electric power storage device. When disconnection occurs at the exposed portion, current collection cannot be achieved and hence a function as the electric power storage device fails. From the foregoing, it has now been found that reliability of the electric power storage device may lower when end-surface current collection is carried out in order to ensure performance even during charging and discharging at a high rate. The present invention provides a method of manufacturing an electric power storage device having ensured performance and reliability even during charging and discharging at a high rate.

It is considered that, when a molten portion of a collector terminal and a molten portion of an exposed portion solidify, these molten portions contract. Here, the molten portion of the collector terminal and the molten portion of the exposed portion solidify while they are in contact with each other. Therefore, it is considered that thinning or disconnection tends to occur at the exposed portion when the molten portion of the exposed portion solidifies while a part of the molten portion of the exposed portion is taken into the collector terminal. The present invention was completed based on such findings.

Specifically, a method of manufacturing an electric power storage device according to the present invention includes a connection step of connecting an exposed portion, which is provided at one end in a direction of width of an electrode and constructed without a composite material layer being provided in a current collector, and a collector terminal provided on an outer side relative to the exposed portion in the direction of width of the electrode to each other. In the connection step, while a metal layer composed of a second metal higher in melting point than a first metal which forms the collector terminal lies between the exposed portion and the collector terminal, at least a portion of contact of the collector terminal with the metal layer is irradiated with energy.

In the method of manufacturing an electric power storage device according to the present invention, the exposed portion and the collector terminal provided on the outer side relative to the exposed portion in the direction of width of the electrode are connected to each other (end-surface current collection). Therefore, an electric power storage device having ensured performance even during charging and discharging at a high rate can be provided.

In the method of manufacturing an electric power storage device according to the present invention, at least a portion of contact of the collector terminal with the metal layer is irradiated with energy while the metal layer lies between the exposed portion and the collector terminal. Therefore, the collector terminal (a molten portion of the collector terminal) which is molten by irradiation with energy comes in contact with the metal layer. Thus, a portion of the metal layer with which the molten portion of the collector terminal is in contact melts and solidifies while the molten metal layer (the molten portion of the metal layer) and the molten portion of the collector terminal are in contact with each other. The exposed portion and the collector terminal are thus connected to each other.

The second metal forming the metal layer is higher in melting point than the first metal forming the collector terminal. Therefore, most of thermal energy of the molten portion of the collector terminal is consumed for melting of the metal layer. Therefore, even though at least a portion of contact of the collector terminal with the metal layer is irradiated with energy, the exposed portion can be prevented from melting. Therefore, since the molten exposed portion can be prevented from being taken into the collector terminal, thinning or disconnection at the exposed portion can be prevented from occurring.

Preferably, the method of manufacturing an electric power storage device according to the present invention further includes the steps of preparing an electrode having the exposed portion and the metal layer provided on a surface of the exposed portion extending in the direction of width of the electrode and bending the exposed portion provided with the metal layer such that at least a part of the metal layer is located on the outer side relative to the exposed portion in the direction of width of the electrode, before the connection step. Thus, such a state that the metal layer lies between the exposed portion and the collector terminal can more readily be realized.

Preferably, in the prepared electrode, an end surface of the metal layer located on a side of the composite material layer is distant from an end surface of a composite material layer located on a side of the metal layer. Thus, the molten portion of the metal layer can be prevented from being in contact with the end surface of the composite material layer located on the side of the metal layer.

Preferably, the second metal is higher in melting point by at least 100° C. than the first metal. Thus, the exposed portion can further be prevented from melting in the step of connection between the exposed portion and the collector terminal. When the first metal is copper, the second metal is preferably at least one of nickel, titanium, chromium, and iron.

Preferably, the metal layer has a thickness not smaller than 0.5 µm and not greater than 10 µm. Thus, in the step of connection between the exposed portion and the collector terminal, thinning or disconnection of the exposed portion can further be prevented from occurring and the metal layer can uniformly be molten.

An electric power storage device according to the present invention includes an electrode having at one end in a direction of width, an exposed portion constructed without a composite material layer being provided in a current collector and a collector terminal provided on an outer side relative to the exposed portion in the direction of width of the electrode and connected to the exposed portion. A connection portion connecting the exposed portion and the collector terminal to each other includes an alloy of a first metal forming the collector terminal and a second metal higher in melting point than the first metal.

In the present specification, when the electric power storage device according to the present invention is implemented by a secondary battery such as a non-aqueous electrolytic secondary battery, the "electrode" means at least one of a positive electrode and a negative electrode. When the electric power storage device according to the present invention is implemented by a capacitor, the "electrode" means at least one of an anode and a cathode.

The "direction of width of the electrode" means a direction perpendicular to a longitudinal direction of the electrode without the electrode forming an electrode assembly and a direction in parallel to a surface of a current collector where a composite material layer is formed. The "electrode assembly" means a structure including a positive electrode, a negative electrode, and a separator provided between the positive electrode and the negative electrode, or a structure including an anode, a cathode, and a separator provided between the anode and the cathode.

The "collector terminal" means a terminal for connecting an electrode and an external terminal to each other. When the electric power storage device is implemented by a secondary battery such as a non-aqueous electrolytic secondary battery, the "collector terminal" includes a positive electrode collector terminal for connecting a positive electrode and a positive electrode external terminal to each other and a negative electrode collector terminal for connecting a negative electrode and a negative electrode external terminal to each other. When the electric power storage device is implemented by a capacitor, the "collector terminal" includes an anode collector terminal for connecting an anode and an anode external terminal to each other and a cathode collector terminal for connecting a cathode and a cathode external terminal to each other. The "collector terminal" may also be referred to as a collector plate.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
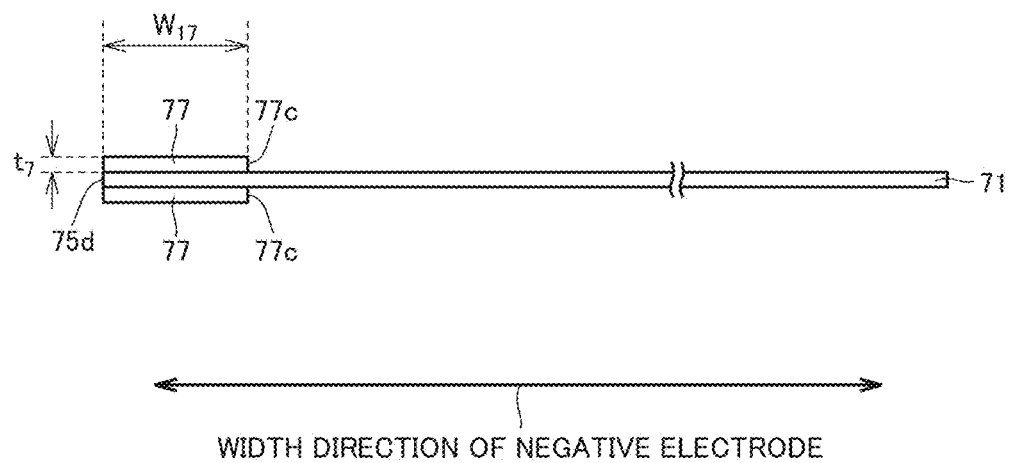
FIGS. 1 to 7 are cross-sectional views of a main portion, showing steps in a method of manufacturing a non-aqueous electrolytic secondary battery in one embodiment of the present invention.

The present invention will be described below with reference to the drawings. In the drawings of the present invention, the same or corresponding elements have the same reference characters allotted. Relation of such a dimension as a length, a width, a thickness, or a depth is modified as appropriate for clarity and brevity of the drawings and does not represent actual dimensional relation.

Though the present invention will be described below with reference to a non-aqueous electrolytic secondary battery representing one example of an electric power storage device, the present invention is not limited to the non-aqueous electrolytic secondary battery and is applicable also to a secondary battery other than the non-aqueous electrolytic secondary battery or to a capacitor.

[Method of Manufacturing Non-Aqueous Electrolytic Secondary Battery]

Figure 6:
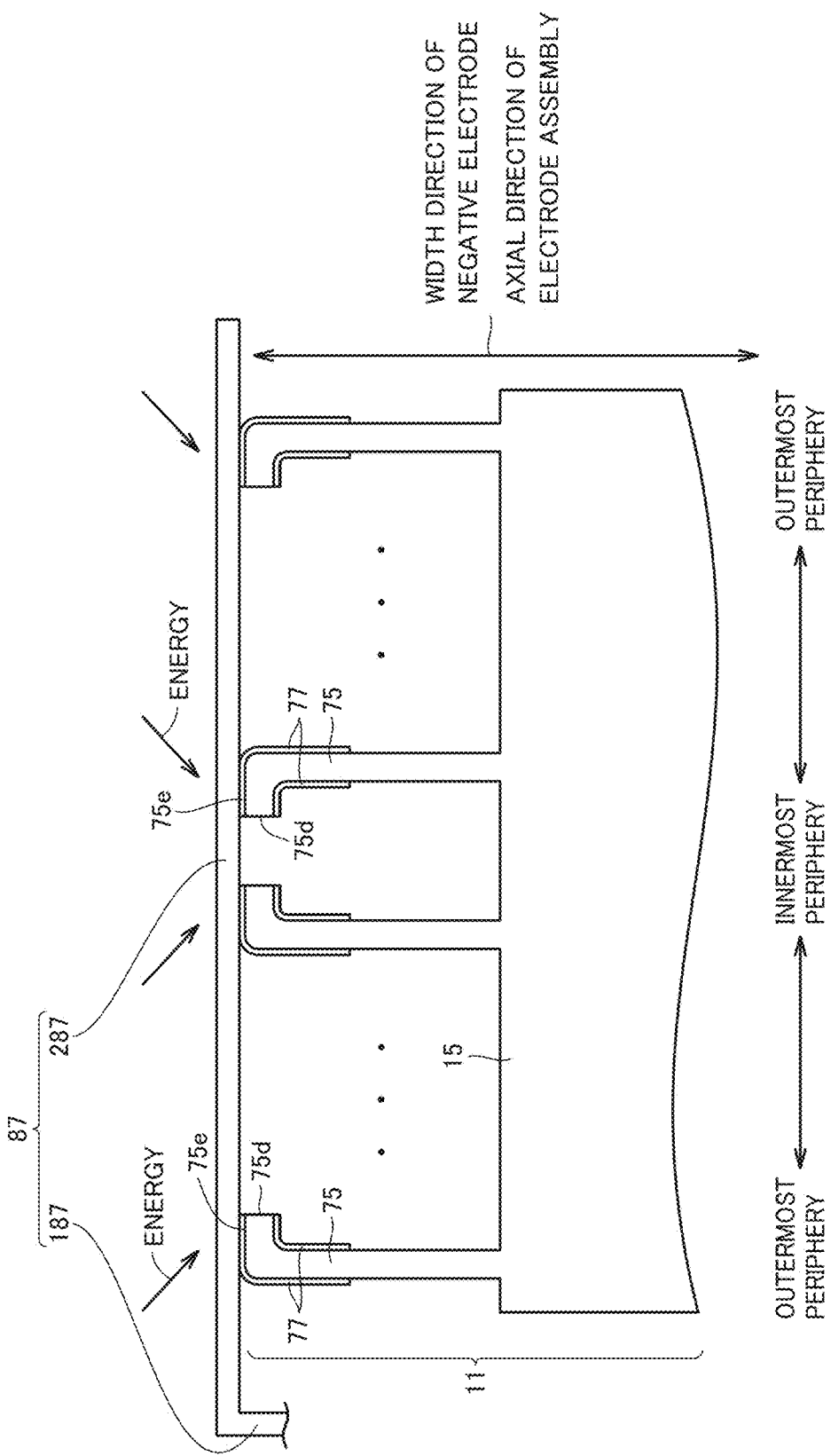
Figure 7:
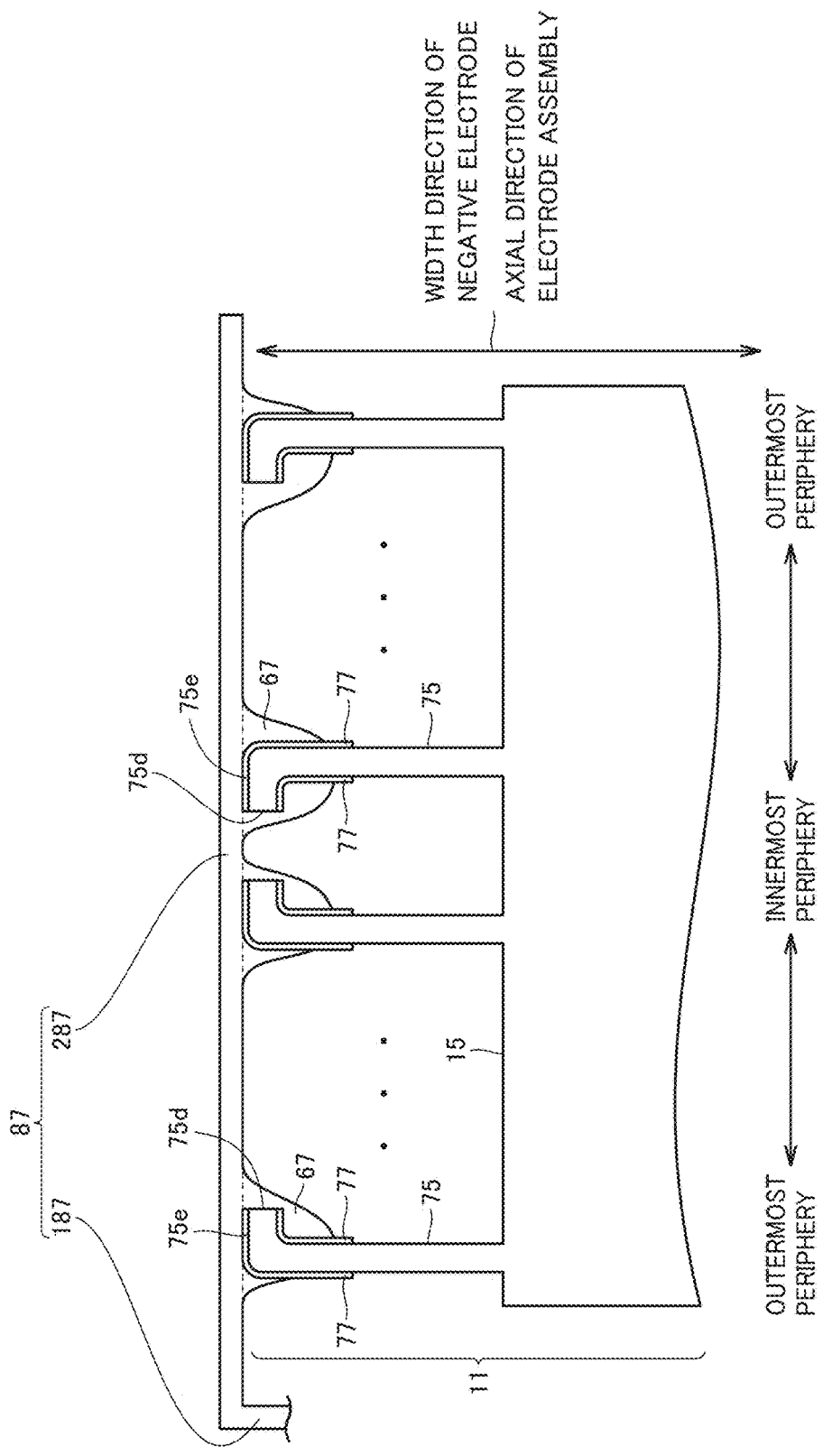
Figure 8:
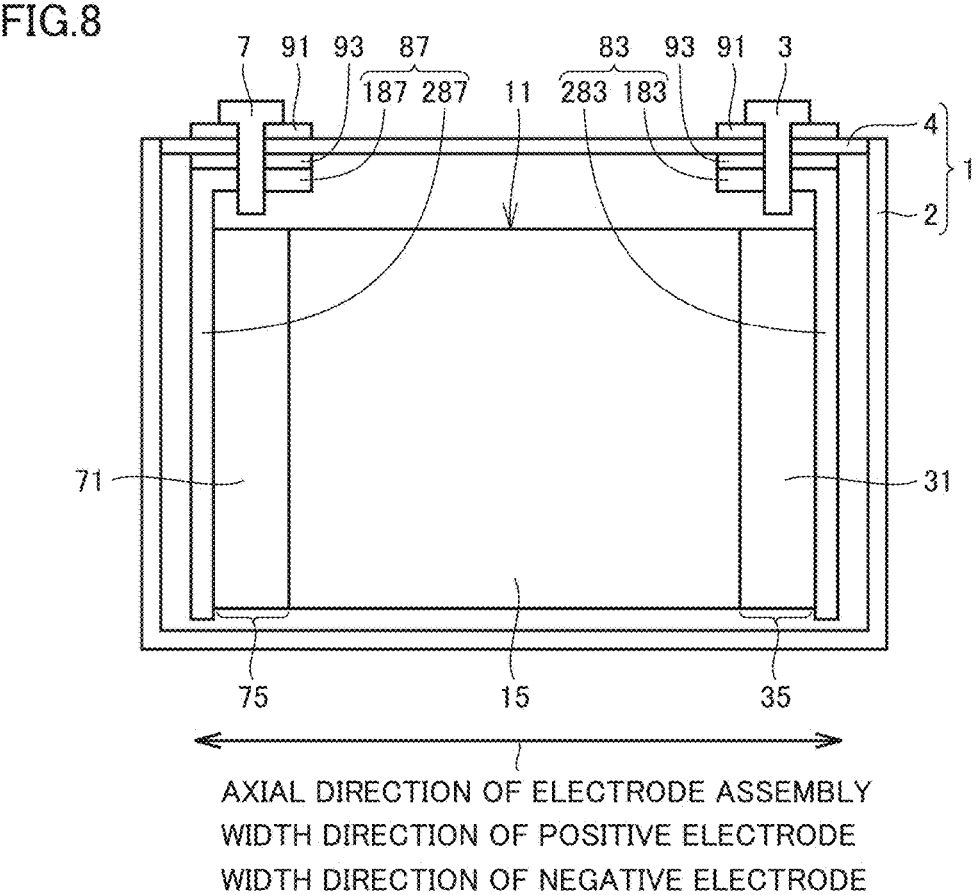
FIG. 8 is a cross-sectional view of the non-aqueous electrolytic secondary battery in one embodiment of the present invention.
Figure 9:
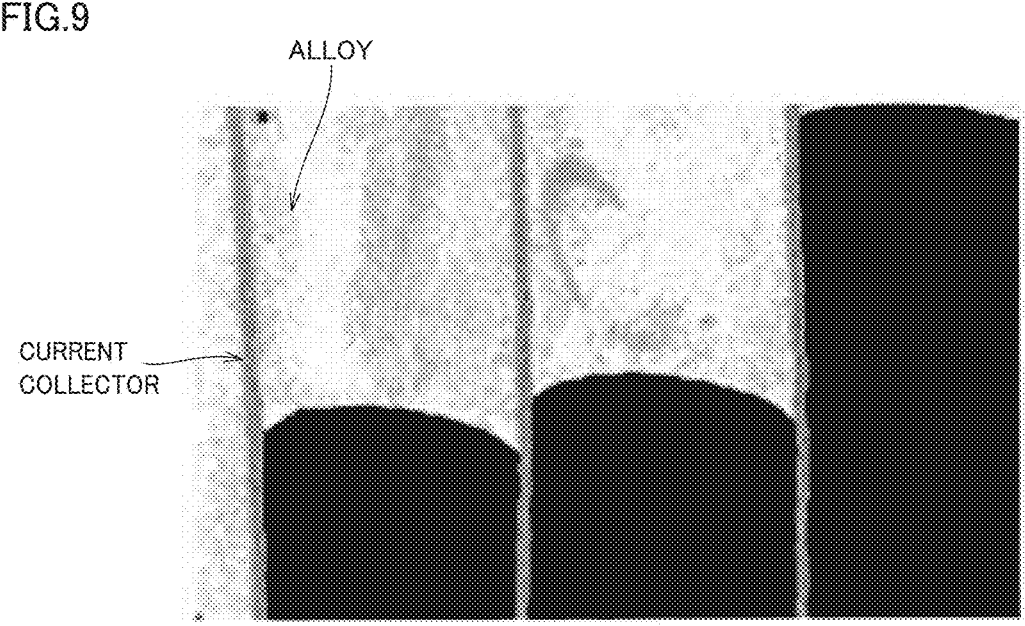
FIG. 9 is a cross-sectional image of a connection portion in one embodiment of the present invention.
Figure 10:
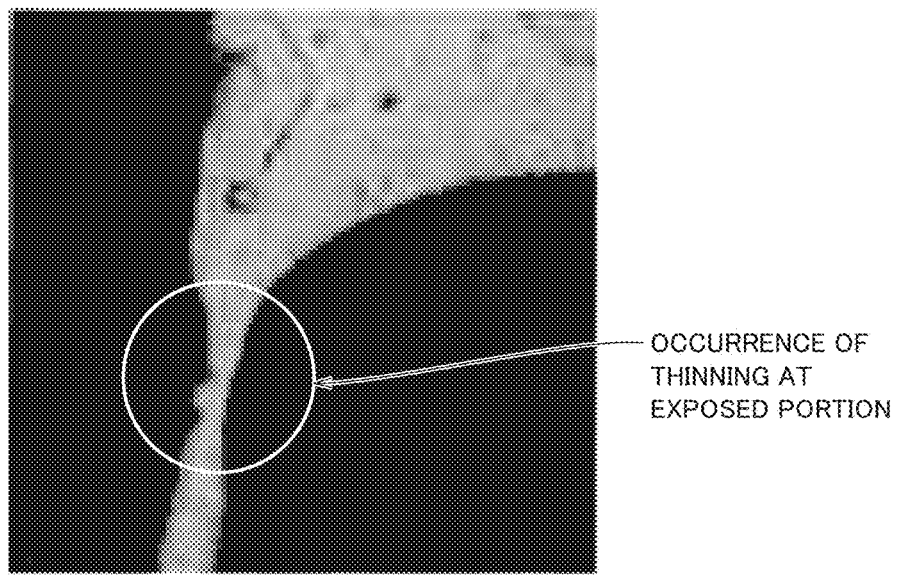
FIG. 10 is an image of a side surface showing a manner at the time when thinning occurs at an exposed portion.
Figure 11:
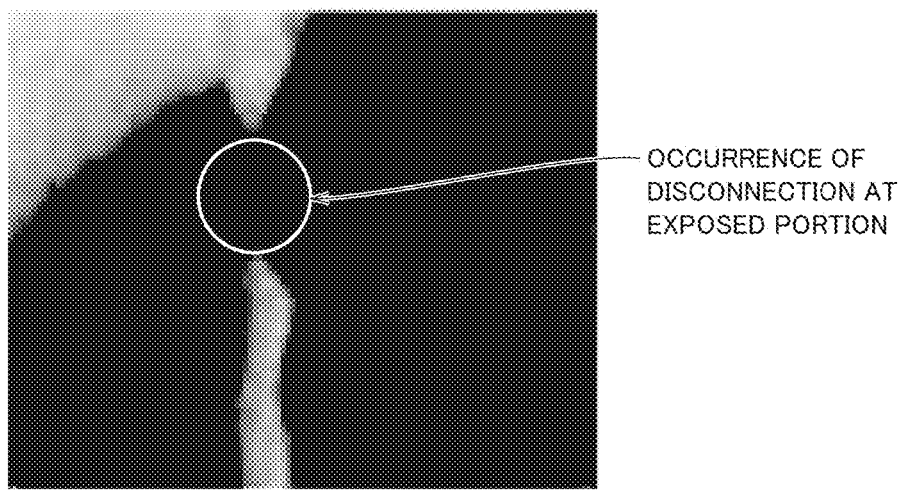
FIG. 11 is an image of a side surface showing a manner at the time when disconnection occurs at an exposed portion.

FIGS. 1 to 7 are cross-sectional views showing a part of a process for manufacturing a non-aqueous electrolytic secondary battery in one embodiment of the present invention. FIG. 8 is a cross-sectional view of the manufactured non-aqueous electrolytic secondary battery. FIG. 9 shows an image of a cross-section of a connection portion connecting an exposed portion and a collector terminal to each other.

The method of manufacturing a non-aqueous electrolytic secondary battery in the present embodiment includes a connection step (FIG. 6) of connecting a negative electrode exposed portion 75 provided at one end in a direction of width of a negative electrode 17 and constructed without a negative electrode composite material layer 73 being provided in a negative electrode current collector 71, and a negative electrode collector terminal 87 provided on an outer side relative to negative electrode exposed portion 75 in the direction of width of negative electrode 17 to each other. In this connection step, while a metal layer 77 composed of a second metal higher in melting point than a first metal forming negative electrode collector terminal 87 lies between negative electrode exposed portion 75 and negative electrode collector terminal 87, at least a portion of contact of negative electrode collector terminal 87 with metal layer 77 is irradiated with energy (FIG. 6). Thus, since negative electrode exposed portion 75 and negative electrode collector terminal 87 can be connected to each other without occurrence of thinning or disconnection at negative electrode exposed portion 75, a non-aqueous electrolytic secondary battery having ensured performance and reliability even during charging and discharging at a high rate can be manufactured.

The method of manufacturing a non-aqueous electrolytic secondary battery in the present embodiment preferably further includes the steps of preparing an electrode (including the steps of preparing negative electrode 17 and preparing a positive electrode 13), fabricating an electrode assembly 11, bending an exposed portion (preferably negative electrode exposed portion 75), accommodating the electrode assembly, and injecting a non-aqueous electrolyte, which are shown below in the order of steps.

<Preparation of Electrode>

(Preparation of Negative Electrode)

In the step of preparing negative electrode 17, negative electrode 17 having negative electrode exposed portion 75 and metal layer 77 is prepared, and preferably, negative electrode 17 further having negative electrode composite material layer 73 is prepared.

Specifically, initially, metal layer 77 is formed on a surface of negative electrode current collector 71 on a side of one end in the direction of width of negative electrode current collector 71 (a portion to be negative electrode exposed portion 75) (FIG. 1). A copper foil having a thickness not smaller than 5 μm and not greater than 50 μm can be employed for negative electrode current collector 71. The direction of width of negative electrode current collector 71 is in parallel to the direction of width of negative electrode 17.

When a portion of the surface of negative electrode current collector 71 (a surface of the portion to be negative electrode exposed portion 75) which is opposed to negative electrode collector terminal 87 in the connection step which will be described later is known in advance, metal layer 77 should be formed only at that portion. In consideration of mass production of the non-aqueous electrolytic secondary batteries in the present embodiment, however, metal layer 77 is preferably formed on a surface of negative electrode current collector 71 extending in the direction of width of negative electrode current collector 71 on the side of one end in the direction of width of negative electrode current collector 71 (a portion to be a surface 75a (FIG. 2) of negative electrode exposed portion 75 extending in the direction of width of negative electrode current collector 71). Thus, even when a position of the portion of the surface of negative electrode current collector 71 which is opposed to negative electrode collector terminal 87 in the connection step which will be described later is displaced from a position as designed for some reason, a state that metal layer 77 lies between negative electrode exposed portion 75 and negative electrode collector terminal 87 can be realized in the connection step which will be described later.

Though metal layer 77 is preferably flush with an end surface of negative electrode current collector 71 located on the side of one end in the direction of width of negative electrode current collector 71 (a portion of negative electrode exposed portion 75 to be a first tip end surface 75d) (FIG. 1), it may be provided also on such an end surface of negative electrode current collector 71.

Though a method of forming metal layer 77 is not particularly limited, for example, plating or vapor deposition is preferably employed. A method of forming metal layer 77 or a condition for forming metal layer 77 is preferably selected as appropriate in accordance with a metal material forming metal layer 77.

A metal forming metal layer 77 is higher in melting point than a metal forming negative electrode collector terminal 87, preferably higher in melting point by at least 100° C. than a metal forming negative electrode collector terminal 87, more preferably higher in melting point by at least 200° C. than a metal forming negative electrode collector terminal 87, and further preferably higher in melting point by at least 400° C. than a metal forming negative electrode collector terminal 87. As a difference in melting point between the metal forming metal layer 77 and the metal forming negative electrode collector terminal 87 is greater, melting of negative electrode exposed portion 75 in the step of connecting negative electrode exposed portion 75 and negative electrode collector terminal 87 to each other can further be prevented. Here, copper is given as one example of a metal forming negative electrode collector terminal 87. The metal forming metal layer 77 is preferably not eluted by charging and discharging of the non-aqueous electrolytic secondary battery. From the foregoing, a metal forming metal layer 77 is preferably at least one of nickel, titanium, chromium, and iron. Metal layer 77 may be composed of an alloy containing two or more metals of nickel, titanium, chromium, and iron.

Metal layer 77 has a width (a size of metal layer 77 in the direction of width of negative electrode 17) $W_{17}$ preferably not smaller than 0.5 mm and not greater than 3 mm and more preferably not smaller than 1 mm. When metal layer 77 has width $W_{17}$ not smaller than 1 mm, at least a part of metal layer 77 tends to be located on the outer side relative to negative electrode exposed portion 75 in the direction of width of negative electrode 17 by bending of negative electrode exposed portion 75 provided with metal layer 77

(FIG. 6). Namely, such a state that at least a part of metal layer 77 lies between negative electrode exposed portion 75 and negative electrode collector terminal 87 is more readily be realized. Thus, occurrence of thinning or disconnection of negative electrode exposed portion 75 in the step of connecting negative electrode exposed portion 75 and negative electrode collector terminal 87 to each other can further be prevented. Width $W_{17}$ of metal layer 77 can be found by observing a scanning electron microscope (SEM) image of a cross-section of negative electrode 17.

Metal layer 77 has a thickness (a size of metal layer 77 in a direction) which is perpendicular to surface 75a of negative electrode exposed portion 75 extending in the direction of width of negative electrode 17) $t_7$ preferably not greater than a thickness of negative electrode current collector 71. Thus, the metal forming negative electrode current collector 71 and the metal forming metal layer 77 can be prevented from forming an alloy in the step of connecting negative electrode exposed portion 75 and negative electrode collector terminal 87 to each other. Therefore, strength of connection between negative electrode exposed portion 75 and negative electrode collector terminal 87 can be ensured.

More preferably, metal layer 77 has thickness $t_7$ not smaller than 0.5 µm and not greater than 10 When metal layer 77 has thickness $t_7$ not smaller than 0.5 µm, melting of negative electrode exposed portion 75 in the step of connecting negative electrode exposed portion 75 and negative electrode collector terminal 87 to each other can further be prevented. Thus, occurrence of thinning or disconnection at negative electrode exposed portion 75 can further be prevented in this connection step. When metal layer 77 has thickness $t_7$ not greater than 10 µm, metal layer 77 can uniformly be molten in the step of connecting negative electrode exposed portion 75 and negative electrode collector terminal 87 to each other. More preferably, metal layer 77 has thickness $t_7$ not greater than 2 µm and not greater than 5 Thickness $t_7$ of metal layer 77 can be found by observing an SEM image of a cross-section of negative electrode 17.

Figure 2:
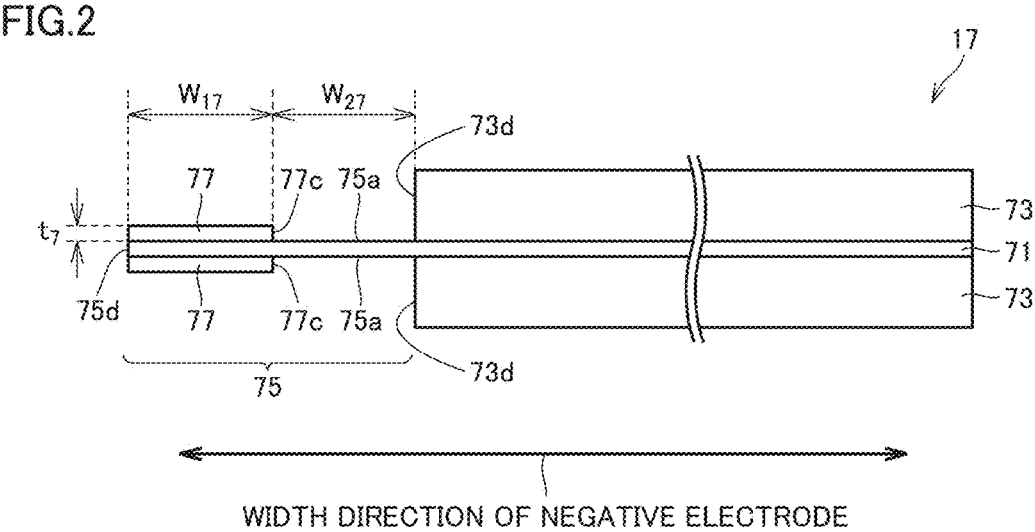

Then, negative electrode composite material layer 73 is formed on opposing surfaces of negative electrode current collector 71 in a portion of negative electrode current collector 71 except for a region where metal layer 77 is formed (FIG. 2).

Preferably, an end surface 77c of metal layer 77 located on a side of negative electrode composite material layer 73 is distant from an end surface 73d of negative electrode composite material layer 73 located on a side of metal layer 77. "End surface 77c of metal layer 77 being distant from end surface 73d of negative electrode composite material layer 73" means that a distance $W_{27}$ between end surface 77c of metal layer 77 and end surface 73d of negative electrode composite material layer 73 in the direction of width of negative electrode 17 is not smaller than 0.5 mm.

When distance $W_{27}$ is not smaller than 0.5 mm, metal layer 77 which is molten in the step of connecting negative electrode exposed portion 75 and negative electrode collector terminal 87 to each other (the molten portion of metal layer 77) and molten negative electrode collector terminal 87 (the molten portion of negative electrode collector terminal 87) can be prevented from coming in contact with end surface 73d of negative electrode composite material layer 73. More preferably, distance $W_{27}$ is not greater than 5 mm. When distance $W_{27}$ is not greater than 5 mm, a width of negative electrode exposed portion 75 can be prevented from being excessively large, and hence high energy density per unit volume of the non-aqueous electrolytic secondary battery can be maintained. Further preferably, distance $W_{27}$ is not smaller than 1 mm and not greater than 3 mm.

A method of forming negative electrode composite material layer 73 is not particularly limited. For example, a negative electrode composite material paste containing a negative electrode active material and a binder is prepared, and the negative electrode composite material paste is applied to a portion of negative electrode current collector 71 except for the region where metal layer 77 is formed, on the opposing surfaces of negative electrode current collector 71. Negative electrode composite material layer 73 can thus be formed.

Wet granules containing a negative electrode active material and a binder are prepared, and the wet granules are compression-bonded to a portion of negative electrode current collector 71 except for the region where metal layer 77 is formed, on the opposing surfaces of negative electrode current collector 71. Negative electrode composite material layer 73 may thus be formed.

When negative electrode composite material layer 73 is formed of the negative electrode composite material paste, a region of negative electrode current collector 71 to which the negative electrode composite material paste was not applied will be negative electrode exposed portion 75. Alternatively, when negative electrode composite material layer 73 is formed of wet granules, a region of negative electrode current collector 71 where wet granules were not compression-bonded will be negative electrode exposed portion 75. Namely, fabricated negative electrode 17 has negative electrode exposed portion 75 at one end in the direction of width of negative electrode 17, and has metal layer 77 on surface 75a of negative electrode exposed portion 75 extending in the direction of width of negative electrode 17 (FIG. 2). Negative electrode exposed portion 75 has a width preferably not smaller than 1 mm and not greater than 10 mm and more preferably not smaller than 3 mm and not greater than 7 mm, although depending on a size of electrode assembly 11.

Negative electrode composite material layer 73 contains preferably 80 mass or more and 99 mass % or less of a negative electrode active material and contains preferably 0.3 mass % or more and 20 mass % or less of a binder. The negative electrode active material may be composed of graphite or an alloy material such as a silicon-based alloy. The binder is preferably composed, for example, of styrene-butadiene rubber (SBR).

An order of formation of negative electrode composite material layer 73 and metal layer 77 is not particularly limited. Metal layer 77 may be formed after negative electrode composite material layer 73 is formed.

Though metal layer 77 may be formed after electrode assembly 11 is fabricated, metal layer 77 is formed preferably before electrode assembly 11 is fabricated. Metal layer 77 is thus more readily formed.

(Preparation of Positive Electrode)

Figure 3:
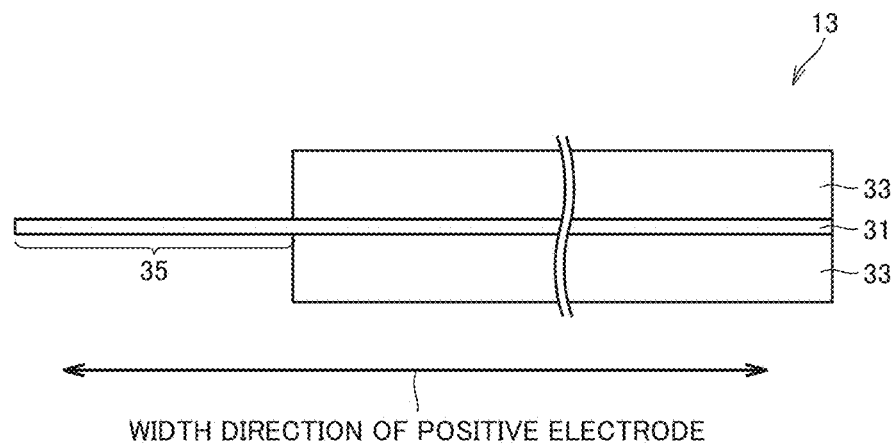

A positive electrode composite material layer 33 is formed on opposing surfaces of a positive electrode current collector 31 in a portion of positive electrode current collector 31 on a side of one end in the direction of width (a portion to be a positive electrode exposed portion 35) (FIG. 3). An aluminum foil or an aluminum alloy foil having a thickness not smaller than 5 µm and not greater than 50 µm can be employed for positive electrode current collector 31. The direction of width of positive electrode current collector 31 is in parallel to the direction of width of positive electrode 13.

A method of forming positive electrode composite material layer 33 is not particularly limited. For example, a positive electrode composite material paste containing a positive electrode active material, a conductive material, and a binder is prepared, and the positive electrode composite material paste is applied to the side of one end in the direction of width of positive electrode current collector 31 (a portion to be positive electrode exposed portion 35), on opposing surfaces of positive electrode current collector 31. Positive electrode composite material layer 33 can thus be formed.

Wet granules containing a positive electrode active material, a conductive material, and a binder are prepared, and the wet granules are compression-bonded to the side of one end in the direction of width of positive electrode current collector 31, on the opposing surfaces of positive electrode current collector 31. Positive electrode composite material layer 33 may thus be formed.

Positive electrode composite material layer 33 preferably contains a positive electrode active material, a conductive material, and a binder. The positive electrode active material may be composed of a lithium composite oxide containing at least one of nickel, cobalt, and manganese, a lithium composite oxide having an olivine-type crystal structure (such as $LiFePO_4$), or a mixture of two or more types of lithium composite oxide. The conductive material is preferably composed of a carbon material such as acetylene black, and the binder is preferably composed of polyvinylidene difluoride (PVdF).

Positive electrode composite material layer 33 contains preferably 80 mass % or more and 95 mass % or less, more preferably 85 mass % or more and 95 mass % or less, and further preferably 90 mass % or more and 95 mass % or less, of the positive electrode active material. Positive electrode composite material layer 33 contains preferably 1 mass % or more and 10 mass % or less and more preferably 3 mass % or more and 10 mass % or less, of the conductive material. Positive electrode composite material layer 33 contains preferably 2 mass % or more and 5 mass % or less of the binder.

<Fabrication of Electrode Assembly>

Electrode assembly 11 is preferably fabricated before the step of connecting negative electrode exposed portion 75 and negative electrode collector terminal 87 to each other.

Figure 4:
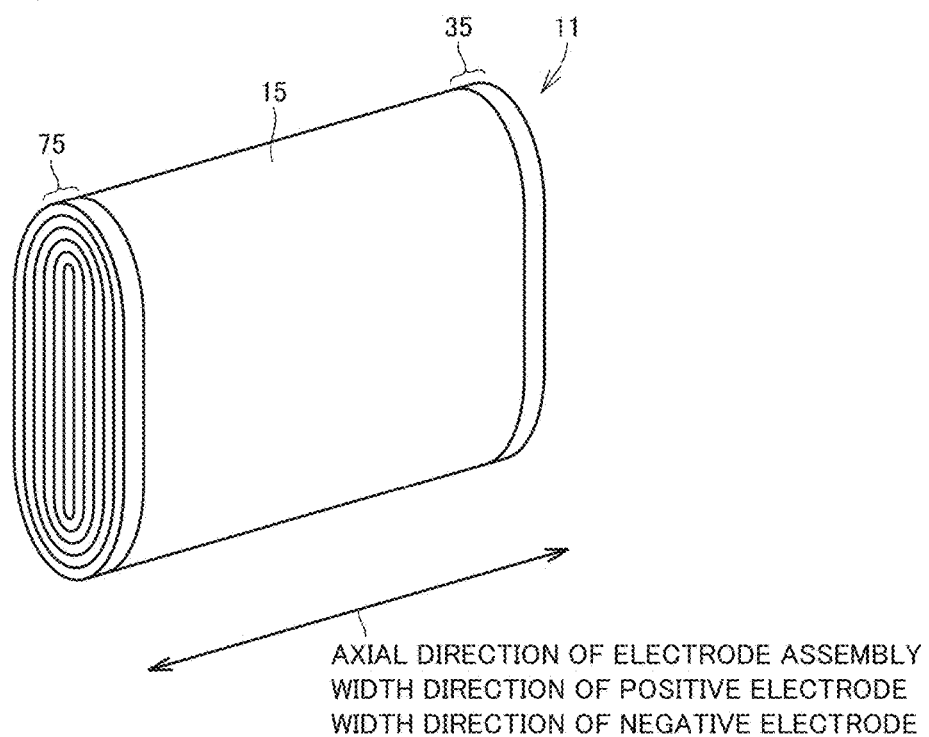

A method of fabricating electrode assembly 11 is not particularly limited. For example, a wound electrode assembly can be fabricated by winding positive electrode 13 and negative electrode 17 with a separator 15 lying therebetween. Specifically, initially, separator 15 is arranged between positive electrode 13 and negative electrode 17. Here, positive electrode 13, negative electrode 17, and separator 15 are arranged such that positive electrode exposed portion 35 and negative electrode exposed portion 75 protrude from separator 15 in directions opposite to each other. Then, an axis of winding is arranged to be in parallel to the direction of width of positive electrode 13 and the direction of width of negative electrode 17, and positive electrode 13, separator 15, and negative electrode 17 are wound around the axis of winding. Electrode assembly 11 (FIG. 4) is thus obtained. A pressure in directions opposite to each other may be applied to the electrode assembly obtained as a result of winding. FIG. 4 does not show metal layer 77.

Separator 15 is preferably made of a conventionally known construction as a construction of the separator of the non-aqueous electrolytic secondary battery, and it may be formed, for example, from a microporous film composed of polyethylene (PE) or polypropylene (PP) or may further have a heat resistant layer.

Though the present embodiment shows a case that a wound electrode assembly is employed for electrode assembly 11, a stack electrode assembly may be employed instead of the wound electrode assembly. In a method of fabricating a stack electrode assembly, for example, positive electrode 13, separator 15, and negative electrode 17 are preferably stacked such that separator 15 lies between positive electrode 13 and negative electrode 17. Here, positive electrode 13, separator 15, and negative electrode 17 are preferably arranged such that positive electrode exposed portion 35 and negative electrode exposed portion 75 protrude from separator 15 in directions opposite to each other.

<Bending of Exposed Portion>

(Bending of Negative Electrode Exposed Portion)

Figure 5:
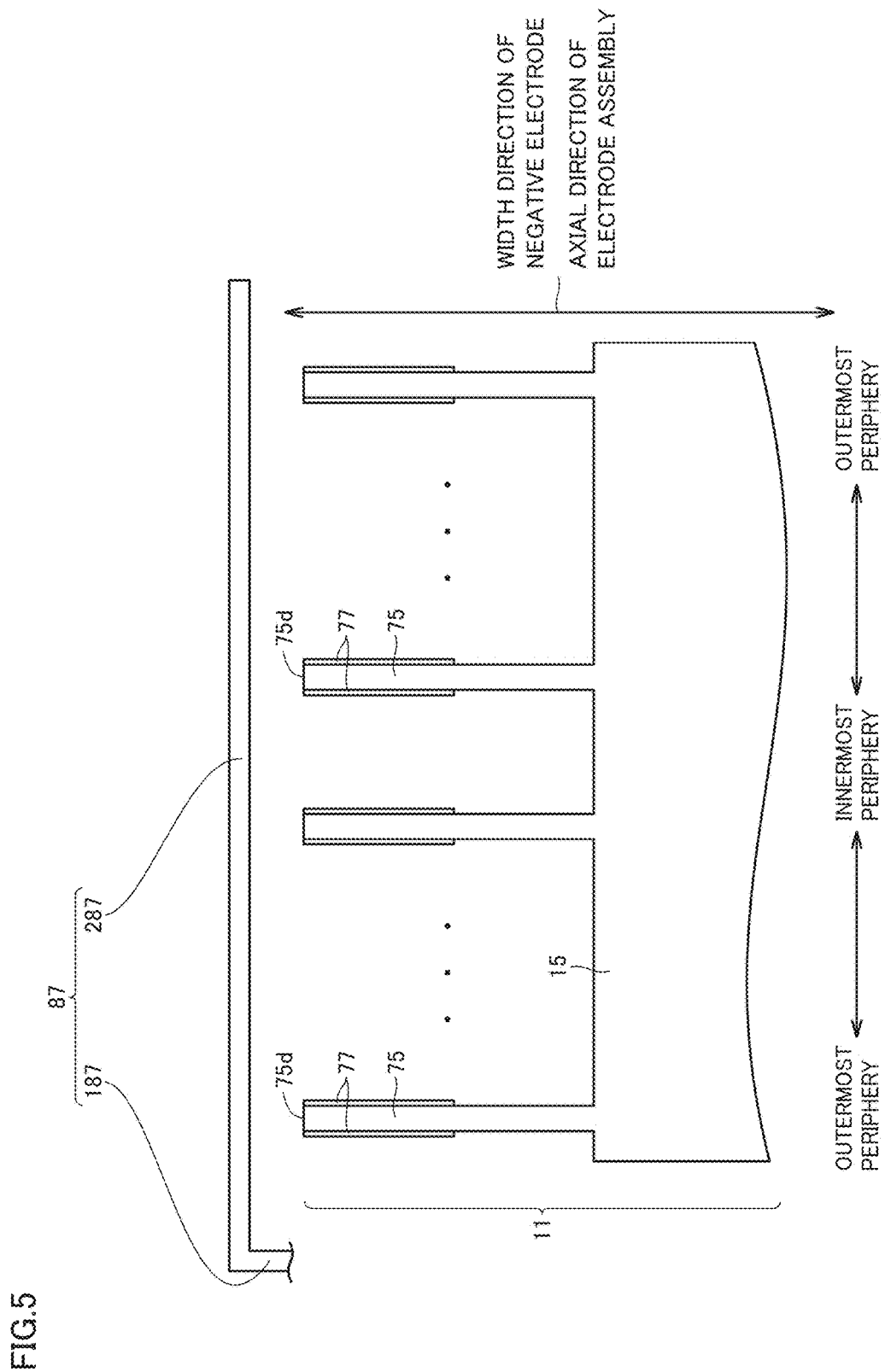

Initially, negative electrode collector terminal 87 is caused to face first tip end surface 75d of negative electrode exposed portion 75 (FIG. 5). Negative electrode collector terminal 87 has a first connection portion 187 connected to a negative electrode external terminal 7 and a second connection portion 287 connected to negative electrode 17 (see FIG. 8). Therefore, second connection portion 287 is preferably caused to face first tip end surface 75d of negative electrode exposed portion 75. "First tip end surface 75d of negative electrode exposed portion 75" means a surface of negative electrode exposed portion 75 located at an end portion in an axial direction of electrode assembly 11 while negative electrode exposed portion 75 extends in parallel to the axial direction of electrode assembly 11.

From a point of view of suppression of current collecting resistance, negative electrode collector terminal 87 is preferably composed of a material the same as that for negative electrode exposed portion 75 and hence preferably composed of copper.

Then, at least one of negative electrode collector terminal 87 and electrode assembly 11 is moved to press second connection portion 287 of negative electrode collector terminal 87 against first tip end surface 75d of negative electrode exposed portion 75. Thus, negative electrode exposed portion 75 provided with metal layer 77 is bent.

When negative electrode exposed portion 75 provided with metal layer 77 is bent, at least a part of metal layer 77 is located on an outer side relative to negative electrode exposed portion 75 in the axial direction of electrode assembly 11. Therefore, at least a part of metal layer 77 lies between negative electrode exposed portion 75 (specifically, a second tip end surface 75e of negative electrode exposed portion 75) and second connection portion 287 of negative electrode collector terminal 87 (FIG. 6). "Second tip end surface 75e of negative electrode exposed portion 75" means a surface of negative electrode exposed portion 75 located at an end portion in the axial direction of electrode assembly 11 as a result of bending of negative electrode exposed portion 75 provided with metal layer 77.

In the present embodiment, after negative electrode exposed portion 75 provided with metal layer 77 is bent with the use of a member which is different from negative electrode collector terminal 87, negative electrode collector terminal 87 may face second tip end surface 75e of negative electrode exposed portion 75.

A shape after bending of negative electrode exposed portion 75 provided with metal layer 77 is not limited to the shape shown in FIG. 6. Negative electrode exposed portion 75 provided with metal layer 77 should only be bent such that at least a part of metal layer 77 is located on the outer side relative to negative electrode exposed portion 75 in the axial direction of electrode assembly 11 (the outer side in the direction of width of negative electrode 17).

<Connection Between Exposed Portion and Collector Terminal>

(Connection Between Negative Electrode Exposed Portion and Negative Electrode Collector Terminal)

While at least a part of metal layer 77 lies between negative electrode exposed portion 75 and second connection portion 287 of negative electrode collector terminal 87, at least a portion of contact of second connection portion 287 of negative electrode collector terminal 87 with metal layer 77 is irradiated with energy (FIG. 6). Thus, in second connection portion 287 of negative electrode collector terminal 87, a portion irradiated with energy melts. Here, energy is emitted from a side opposite to electrode assembly 11 with respect to second connection portion 287 of negative electrode collector terminal 87 (an upper side in FIG. 6) toward at least the portion of contact of negative electrode collector terminal 87 with metal layer 77. Therefore, molten negative electrode collector terminal 87 (the molten portion of negative electrode collector terminal 87) moves toward electrode assembly 11 owing to its own weight.

Since at least the portion of contact of second connection portion 287 of negative electrode collector terminal 87 with metal layer 77 is irradiated with energy while at least a part of metal layer 77 lies between negative electrode exposed portion 75 and second connection portion 287 of negative electrode collector terminal 87, the molten portion of negative electrode collector terminal 87 is in contact with metal layer 77, rather than with negative electrode exposed portion 75. Therefore, a portion of metal layer 77 to which the molten portion of negative electrode collector terminal 87 is in contact melts, and the molten portion of negative electrode collector terminal 87 and molten metal layer 77 (the molten portion of metal layer 77) solidify while they are in contact with each other. Negative electrode exposed portion 75 and negative electrode collector terminal 87 are thus connected to each other (FIG. 7). Therefore, a connection portion 67 containing an alloy of the metal forming metal layer 77 and the metal forming negative electrode collector terminal 87 (specifically, second connection portion 287 of negative electrode collector terminal 87) connects negative electrode exposed portion 75 and negative electrode collector terminal 87 to each other.

In the present embodiment, since the metal forming metal layer 77 is higher in melting point than the metal forming negative electrode collector terminal 87, most of thermal energy of the molten portion of negative electrode collector terminal 87 is consumed for melting of metal layer 77. Thus, even though the molten portion of negative electrode collector terminal 87 is in contact with metal layer 77, negative electrode exposed portion 75 can be prevented from melting (negative electrode exposed portion 75 being located opposite to the molten portion of negative electrode collector terminal 87 with respect to metal layer 77). Therefore, since molten negative electrode exposed portion 75 can be prevented from being taken into negative electrode collector terminal 87, occurrence of thinning or disconnection at negative electrode exposed portion 75 can be prevented even when the molten portion of negative electrode collector terminal 87 and the molten portion of metal layer 77 solidify.

A condition for irradiation with energy is not particularly limited, and a condition conventionally known as a condition for irradiation with energy in end-surface current collection is preferred. For example, laser beams having energy with which negative electrode collector terminal 87 can be molten are preferably emitted to at least a portion of contact of negative electrode collector terminal 87 with metal layer 77.

Whether negative electrode exposed portion 75 is molten or not can be checked in an SEM image of a cross-section of connection portion 67. The present inventors have confirmed that connection portion 67 contains an alloy (shown as "alloy" in FIG. 9) of the metal forming metal layer 77 and the metal forming negative electrode collector terminal 87 (specifically, second connection portion 287 of negative electrode collector terminal 87), in the SEM image of the cross-section of connection portion 67.

A shape of connection portion 67 is not limited to the shape shown in FIG. 7. A state of melting of each of negative electrode exposed portion 75 and metal layer 77 is not limited to the state of melting shown in FIG. 7.

After negative electrode external terminal 7 provided in a lid body 4 and first connection portion 187 of negative electrode collector terminal 87 are connected to each other, negative electrode exposed portion 75 and second connection portion 287 of negative electrode collector terminal 87 may be connected to each other.

(Connection of Positive Electrode Exposed Portion and Positive Electrode Collector Terminal)

Initially, a positive electrode collector terminal 83 is caused to face a tip end surface of positive electrode exposed portion 35. Positive electrode collector terminal 83 has a first connection portion 183 connected to a positive electrode external terminal 3 and a second connection portion 283 connected to positive electrode 13 similarly to negative electrode collector terminal 87 (see FIG. 8). Therefore, second connection portion 283 is preferably caused to face the tip end surface of positive electrode exposed portion 35. From a point of view of suppression of current collecting resistance, positive electrode collector terminal 83 is preferably composed of a material the same as that for positive electrode exposed portion 35 and hence preferably composed of aluminum.

Then, at least one of positive electrode collector terminal 83 and electrode assembly 11 is moved to press second connection portion 283 of positive electrode collector terminal 83 against the tip end surface of positive electrode exposed portion 35. Thereafter, at least a portion of contact of second connection portion 283 of positive electrode collector terminal 83 with positive electrode exposed portion 35 is irradiated with energy. Thus, positive electrode exposed portion 35 and second connection portion 283 of positive electrode collector terminal 83 are connected to each other.

In the present embodiment, the step of connecting negative electrode exposed portion 75 and negative electrode collector terminal 87 to each other may be performed after the step of connecting positive electrode exposed portion 35 and positive electrode collector terminal 83 to each other, or the step of connecting positive electrode exposed portion 35 and positive electrode collector terminal 83 to each other may be performed after the step of connecting negative electrode exposed portion 75 and negative electrode collector terminal 87 to each other.

Positive electrode exposed portion 35 and second connection portion 283 of positive electrode collector terminal 83 may be connected to each other after positive electrode external terminal 3 provided in lid body 4 and first connection portion 183 of positive electrode collector terminal 83 are connected to each other.

<Accommodation of Electrode Assembly>

Initially, a battery case 1 is prepared. Battery case 1 has a case main body 2 and lid body 4 sealing an opening of case main body 2, and is preferably made, for example, of aluminum. Positive electrode external terminal 3 provided in lid body 4 and first connection portion 183 of positive electrode collector terminal 83 are connected to each other, and negative electrode external terminal 7 provided in lid body 4 and first connection portion 187 of negative electrode collector terminal 87 are connected to each other. Here, positive electrode external terminal 3 and negative electrode external terminal 7 are isolated from lid body 4 by an insulating member 91, and positive electrode collector terminal 83 and negative electrode collector terminal 87 are isolated from lid body 4 by an insulating member 93. Lid body 4 is thus connected to electrode assembly 11.

Then, electrode assembly 11 to which lid body 4 is connected is placed in a recess in case main body 2, and the opening of case main body 2 is sealed with lid body 4. Thereafter, lid body 4 is welded to a periphery of the opening of case main body 2.

<Injection of Non-Aqueous Electrolyte>

Initially, a non-aqueous electrolyte is prepared. The non-aqueous electrolyte is preferably composed of a composition conventionally known as a non-aqueous electrolyte for a non-aqueous electrolytic secondary battery, and it preferably contains, for example, one or more types of organic solvent and one or more types of lithium salt (for example, $LiPF_6$), and more preferably further contains an overcharge suppression agent (for example, cyclohexylbenzene or biphenyl).

Then, the non-aqueous electrolyte is injected through a fluid injection hole formed in case main body 2 or lid body 4. After a pressure in case main body 2 is reduced as necessary, the fluid injection hole is sealed. The non-aqueous electrolytic secondary battery shown in FIG. 8 can thus be manufactured.

Though the method of manufacturing a non-aqueous electrolytic secondary battery in the present embodiment has been shown above, the method of manufacturing a non-aqueous electrolytic secondary battery in the present embodiment may have a feature shown as follows.

A metal layer may be formed on a surface of positive electrode exposed portion 35 extending in the direction of width of positive electrode 13. In this case, the metal forming the metal layer is higher in melting point than the metal forming positive electrode collector terminal 83, preferably higher in melting point by at least 100° C. than the metal forming positive electrode collector terminal 83, more preferably higher in melting point by at least 200° C. than the metal forming positive electrode collector terminal 83, and further preferably higher in melting point by at least 400° C. than the metal forming positive electrode collector terminal 83. Here, aluminum represents one example of a metal forming positive electrode collector terminal 83. A metal forming the metal layer formed in positive electrode exposed portion 35 is preferably not eluted by charging and discharging of the non-aqueous electrolytic secondary battery. Based on the above, a metal forming the metal layer formed in positive electrode exposed portion 35 is preferably determined. The metal layer may be formed on both of the surface of positive electrode exposed portion 35 extending in the direction of width of positive electrode 13 and the surface of negative electrode exposed portion 75 extending in the direction of width of negative electrode 17.

Negative electrode 17 may be prepared without forming metal layer 77. In this case, metal layer 77 is arranged between second tip end surface 75e of negative electrode exposed portion 75 and second connection portion 287 of negative electrode collector terminal 87 after the step of bending negative electrode exposed portion 75, and thereafter at least a portion of contact of second connection portion 287 of negative electrode collector terminal 87 with metal layer 77 is irradiated with energy. An effect described in the present embodiment is thus obtained. In consideration of mass production of the non-aqueous electrolytic secondary batteries, however, the non-aqueous electrolytic secondary battery is preferably manufactured in accordance with the method of manufacturing the non-aqueous electrolytic secondary battery in the present embodiment.

[Construction of Non-Aqueous Electrolytic Secondary Battery]

The non-aqueous electrolytic secondary battery in the present embodiment is manufactured in accordance with the method of manufacturing the non-aqueous electrolytic secondary battery in the present embodiment. Namely, connection portion 67 connecting negative electrode exposed portion 75 and negative electrode collector terminal 87 to each other contains an alloy of a metal (a first metal) forming negative electrode collector terminal 87 and a metal (a second metal higher in melting point than the first metal) forming metal layer 77.

EXAMPLES

Though the present invention will be described below in further detail with reference to Examples, the present invention is not limited to the below.

Example 1

<Manufacturing of Lithium Ion Secondary Battery>
(Preparation of Positive Electrode)

A composite oxide containing Li and three types of transition metal element (Ni, Co, and Mn) was prepared as the positive electrode active material. The positive electrode active material, acetylene black (conductive material), and PVdF (binder) were placed and mixed at a mass ratio of 90:8:2, and thereafter they were diluted with N-methylpyrrolidone (NMP). The positive electrode composite material paste was thus obtained.

The positive electrode composite material paste was applied to opposing surfaces of an Al foil except for a region of the Al foil (a positive electrode current collector having a thickness of 15 μm) extending by 5 mm from one end in the direction of width, and thereafter the positive electrode composite material paste was dried. The obtained electrode plate was rolled to thereby obtain the positive electrode. The positive electrode exposed portion (having a width of 5 mm) was formed at one end in the direction of width of the positive electrode. In the region except for one end in the direction of width of the positive electrode, the positive electrode composite material layer was formed on opposing surfaces of the Al foil.

(Preparation of Negative Electrode)

An electrolytic copper foil having a thickness of 10 μm was prepared as the negative electrode current collector. With electroless plating, a nickel layer (having a thickness of 3 μm) was formed on opposing surfaces of the electrolytic copper foil in a region extending by 2 mm from one end (hereinafter denoted as a "first end of the electrolytic copper foil") in the direction of width of the electrolytic copper foil.

Natural graphite was prepared as the negative electrode active material. The negative electrode active material, carboxymethylcellulose (CMC) (thickener), and SBR (binder) were mixed at a mass ratio of 98:1:1 and diluted with water. The negative electrode composite material paste was thus obtained.

The negative electrode composite material paste was applied to opposing surfaces of the electrolytic copper foil except for a region extending by 5 mm from the first end of the electrolytic copper foil and thereafter dried. The obtained electrode plate was rolled to thereby obtain the negative electrode. The negative electrode exposed portion (having a width of 5 mm) was formed at one end in the direction of width of the negative electrode. A nickel layer (having a width of 2 mm and a thickness of 3 μm) was formed on the opposing surfaces of the negative electrode exposed portion (the surface of the negative electrode exposed portion extending in the direction of width of the negative electrode). The negative electrode composite material layer was formed on the opposing surfaces of the electrolytic copper foil in the region except for one end in the direction of width of the negative electrode.

(Fabrication of Electrode Assembly)

A separator composed of polyethylene (PE) was prepared. The positive electrode, the negative electrode, and the separator were arranged such that the positive electrode exposed portion and the negative electrode exposed portion protruded from the separator in directions opposite to each other. Thereafter, an axis of winding was arranged to be in parallel to the direction of width of the Al foil and the direction of width of the Cu foil, and the positive electrode, the separator, and the negative electrode were wound around the axis of winding. A flat electrode assembly was obtained by applying a pressure in directions opposite to each other to the electrode assembly thus obtained (a cylindrical electrode assembly).

(Connection Between Positive Electrode Exposed Portion and Positive Electrode Collector Terminal)

The positive electrode collector terminal (material: aluminum, thickness: 0.6 mm, width: 12 mm) having the first connection portion and the second connection portion (length: 50 mm) was prepared, and the second connection portion of the positive electrode collector terminal was welded to the positive electrode exposed portion. The positive electrode exposed portion and the positive electrode collector terminal were thus connected to each other.

(Bending of Negative Electrode Exposed Portion)

The negative electrode collector terminal (material: copper, thickness: 0.6 mm, width: 12 mm) having the first connection portion and the second connection portion (length: 50 mm) was prepared. After the second connection portion of the negative electrode collector terminal was caused to face the first tip end surface of the negative electrode exposed portion, the negative electrode collector terminal was moved to press the second connection portion of the negative electrode collector terminal against the first tip end surface of the negative electrode exposed portion. The negative electrode exposed portion provided with the nickel layer was thus bent and hence a part of the nickel layer lay between the negative electrode exposed portion and the second connection portion of the negative electrode collector terminal.

(Connection Between Negative Electrode Exposed Portion and Negative Electrode Collector Terminal)

A portion of contact of the negative electrode collector terminal with the nickel layer was irradiated with laser beams from a side opposite to the electrode assembly with respect to the second connection portion of the negative electrode collector terminal. The negative electrode exposed portion and the negative electrode collector terminal were thus connected to each other.

(Accommodation of Electrode Assembly)

A battery case having a case main body and a lid body was prepared. The positive electrode external terminal was fixed to the lid body with the insulating member being interposed and the first connection portion of the positive electrode collector terminal was fixed to the lid body with another insulating member being interposed. The negative electrode external terminal was fixed to the lid body with the insulating member being interposed, and the first connection portion of the negative electrode collector terminal was fixed to the lid body with another insulating member being interposed. The lid body was thus connected to the electrode assembly. Thereafter, the electrode assembly was placed in the recess in the case main body and the opening of the case main body was sealed with the lid body.

(Preparation and Injection of Non-Aqueous Electrolyte)

Ethylene carbonate (EC), dimethyl carbonate (DMC), and ethylmethyl carbonate (EMC) were mixed at a volume ratio of 3:4:3. $LiPF_6$ was added to a mixed solvent thus obtained, to thereby obtain a non-aqueous electrolyte. The obtained non-aqueous electrolyte had a concentration of $LiPF_6$ at 1.0 mol/L.

The obtained non-aqueous electrolyte was injected into the recess in the case main body through the fluid injection hole formed in the lid body. After a pressure in the battery case was reduced, the fluid injection hole was sealed. A lithium ion secondary battery (having a battery capacity of 4 Ah) according to the present Example was thus obtained. Thirty lithium ion secondary batteries according to the present Example were fabricated in accordance with the method described above.

<High-Rate Test>

The thirty lithium ion secondary batteries were subjected to a high-rate test at 25° C. In the high-rate test, charging at a current of 30 C was carried out for 10 seconds followed by rest for 10 minutes, and discharging at a current of 5 C was carried out for 1 minute followed by rest for 10 minutes, which was defined as 1 cycle. Ten thousand cycles were carried out.

After the high-rate test ended, the lithium ion secondary battery was disassembled and whether thinning or disconnection at the exposed portion occurred or not was checked. Table 1 shows results.

Examples 2 to 11 and Comparative Example 1

(Thirty) lithium ion secondary batteries were manufactured in accordance with the method described in Example 1 except for change in construction of the metal layer as shown in Table 1. Namely, in Comparative Example 1, the negative electrode exposed portion and the second connection portion of the negative electrode collector terminal were connected to each other with the method similar to the method of connecting the positive electrode exposed portion and the second connection portion of the positive electrode collector terminal to each other in Example 1. Thereafter, 30 lithium ion secondary batteries were evaluated in accordance with the method described in Example 1. Table 1 shows results.

TABLE 1

| | Metal Layer | | | Occurrence of Defect |
|---|---|---|---|---|
| | Material | Thickness (μm) | Width (mm) | |
| Comparative Example 1 | — | — | — | 7/30 |
| Example 6 | Nickel | 0.3 | 2 | 5/30 |
| Example 4 | Nickel | 0.5 | 2 | 1/30 |
| Example 5 | Nickel | 2 | 2 | 0/30 |
| Example 1 | Nickel | 3 | 2 | 0/30 |
| Example 2 | Nickel | 5 | 2 | 0/30 |
| Example 3 | Nickel | 10 | 2 | 2/30 |
| Example 7 | Nickel | 12 | 2 | 5/30 |
| Example 8 | Nickel | 3 | 3 | 0/30 |
| Example 9 | Nickel | 3 | 5 | 1/30 |
| Example 10 | Titanium | 3 | 2 | 0/30 |
| Example 11 | Chromium | 3 | 2 | 0/30 |

"Occurrence of defect" in Table 1 shows (the number of lithium ion secondary batteries in which occurrence of thinning or disconnection at the exposed portion was confirmed)/(the total number (30) of lithium ion secondary batteries).

[Results]

Occurrence of defect was higher in Comparative Example 1 than in Examples 1 to 11. It was found from this result that a portion of contact of the negative electrode collector terminal with the nickel layer was preferably irradiated with energy while a part of the nickel layer lay between the negative electrode exposed portion and the second connection portion of the negative electrode collector terminal.

Examples 1 to 5 were further lower in occurrence of defect than Example 6. It was found from this result that the nickel layer had a thickness preferably not smaller than 0.5 μm.

Examples 1 to 5 were further lower in occurrence of defect than Example 7. It was found from this result that the nickel layer had a thickness preferably not greater than the thickness of the electrolytic copper foil (10 μm). When the nickel layer is greater in thickness than the electrolytic copper foil, a metal forming the electrolytic copper foil and nickel tend to form an alloy owing to irradiation with energy. Therefore, it is considered that strength of connection between the negative electrode exposed portion and the negative electrode collector terminal lowered and hence occurrence of defect in Example 7 was 5/30.

In Examples 1, 8, and 9, occurrence of defect could be suppressed. It was found from this result that the nickel layer had a width preferably not smaller than 2 μm and not greater than 5 μm.

In Examples 1, 10, and 11, occurrence of defect could be suppressed. It was found from this result that a similar effect was obtained also when a metal layer was formed of titanium or chromium instead of nickel.

Though the embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. A method of manufacturing an electric power storage device, comprising:
 a connection step of connecting an exposed portion, which is provided at one end in a direction of width of an electrode and constructed without a composite material layer being provided in a current collector, and a collector terminal provided on an outer side relative to said exposed portion in the direction of width of said electrode to each other,
 wherein, in said connection step, while a metal layer composed of a second metal higher in melting point than a first metal which forms said collector terminal lies between said exposed portion and said collector terminal, at least a portion of contact of said collector terminal with said metal layer being irradiated with energy,
 said metal layer has a thickness not smaller than 0.5 μm and not greater 10 μm, and
 said metal layer has a thickness not greater than a thickness of said current collector.

2. The method of manufacturing an electric power storage device according to claim 1, further comprising the steps of:
 preparing an electrode having said exposed portion and said metal layer provided on a surface of said exposed portion extending in the direction of width of said electrode; and
 bending said exposed portion provided with said metal layer such that at least a part of said metal layer is located on the outer side relative to said exposed portion in the direction of width of said electrode, before said connection step.

3. The method of manufacturing an electric power storage device according to claim 2, wherein
 in prepared said electrode, an end surface of the metal layer located on a side of said composite material layer is distant from an end surface of a composite material layer located on a side of said metal layer.

4. The method of manufacturing an electric power storage device according to claim 1, wherein
 said second metal is higher in melting point by at least 100° C. than said first metal.

5. The method of manufacturing an electric power storage device according to claim 4, wherein
 said first metal is copper, and
 said second metal is at least one of nickel, titanium, chromium, and iron.

6. The method of manufacturing an electric power storage device according to claim 1, wherein
 said metal layer has a thickness not smaller than 2 μm and not greater than 5 μm.

7. The method of manufacturing an electric power storage device according to claim 1, wherein
 said metal layer has a width extending in the direction of width of the electrode of not smaller than 1 mm and not greater than 10 mm.

8. The method of manufacturing an electric power storage device according to claim 6, wherein
 said metal layer has a width extending in the direction of width of the electrode of not smaller than 1 mm and not greater than 10 mm.

9. The method of manufacturing an electric power storage device according to claim 1, wherein
 said metal layer has a width extending in the direction of width of the electrode of not smaller than 2 mm and not greater than 5 mm.

10. The method of manufacturing an electric power storage device according to claim 6, wherein
 said metal layer has a width extending in the direction of width of the electrode of not smaller than 2 mm and not greater than 5 mm.

11. The method of manufacturing an electric power storage device according to claim 1, wherein said metal layer has a width extending in the direction of width of the electrode of not smaller than 3 mm and not greater than 7 mm.

12. The method of manufacturing an electric power storage device according to claim 7, wherein
    said first metal is copper, and
    said second metal is at least one of nickel, titanium, chromium, and iron.

13. The method of manufacturing an electric power storage device according to claim 10, wherein
    said first metal is copper, and
    said second metal is at least one of nickel, titanium, chromium, and iron.

14. The method of manufacturing an electric power storage device according to claim 1, wherein
    before said connection step, said metal layer is formed on a surface of said electrode current collector.

15. The method of manufacturing an electric power storage device according to claim 7, wherein
    before said connection step, said metal layer is formed on a surface of said electrode current collector.

16. The method of manufacturing an electric power storage device according to claim 12, wherein
    before said connection step, said metal layer is formed on a surface of said electrode current collector.

17. The method of manufacturing an electric power storage device according to claim 13, wherein
    before said connection step, said metal layer is formed on a surface of said electrode current collector.

18. An electric power storage device, comprising:
    an electrode having at one end in a direction of width, an exposed portion constructed without a composite material layer being provided in a current collector; and
    a collector terminal provided on an outer side relative to said exposed portion in the direction of width of said electrode and connected to said exposed portion,
    wherein a connection portion connecting said exposed portion and said collector terminal to each other including an alloy of a first metal forming said collector terminal and a second metal higher in melting point than said first metal,
    said metal layer has a thickness not smaller than 0.5 μm and not greater than 10 μm, and
    said metal layer has a thickness not greater than a thickness of the current collector.

19. The electric power storage device according to claim 18, wherein
    said metal layer has a thickness not smaller than 2 μm and not greater than 5 μm.

* * * * *